C. R. HOUGHTON.
DUST SEPARATOR.
APPLICATION FILED JULY 10, 1916.
1,232,464.
Patented July 3, 1917.
3 SHEETS—SHEET 1.
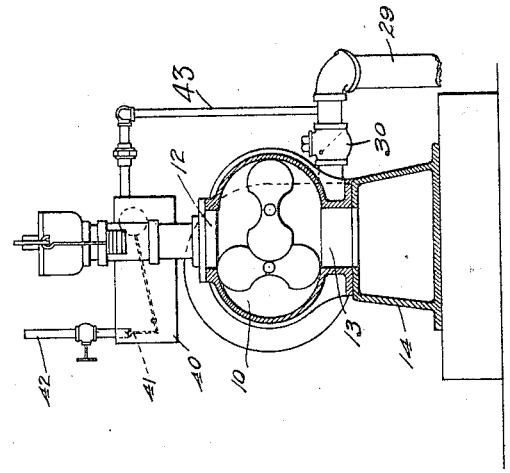
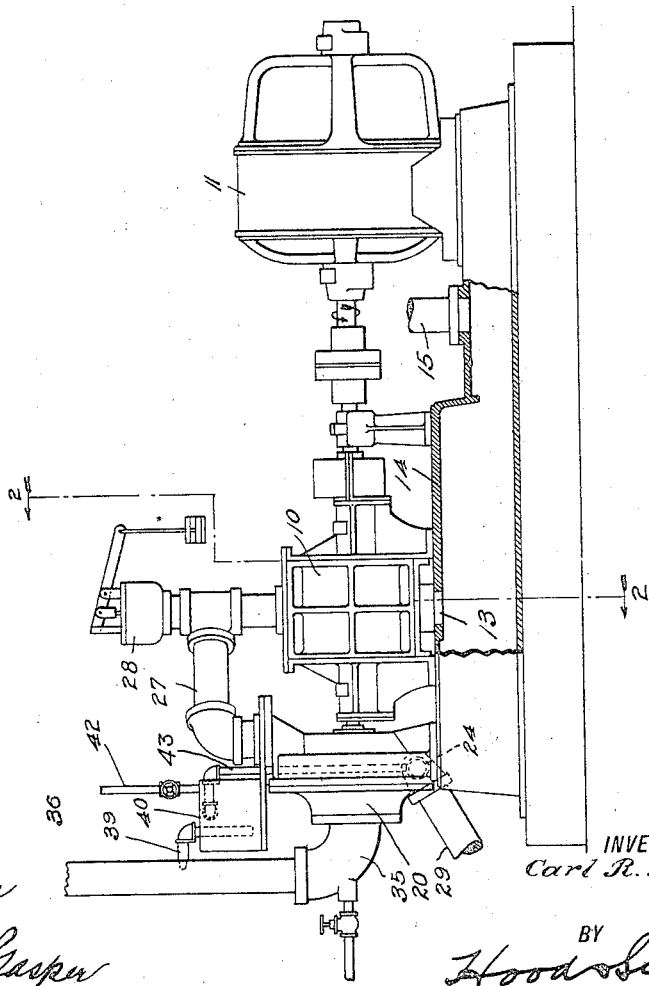
WITNESSES:
Frank A. Sahle
Josephine Gasper
INVENTOR
Carl R. Houghton,
BY
Hood Schley
ATTORNEYS

C. R. HOUGHTON.
DUST SEPARATOR.
APPLICATION FILED JULY 10, 1916.

1,232,464.

Patented July 3, 1917.
3 SHEETS—SHEET 2.

WITNESSES:
Frank A. Fable
Josephine Gasper

INVENTOR
Carl R. Houghton,
BY
Hood & Schley
ATTORNEYS

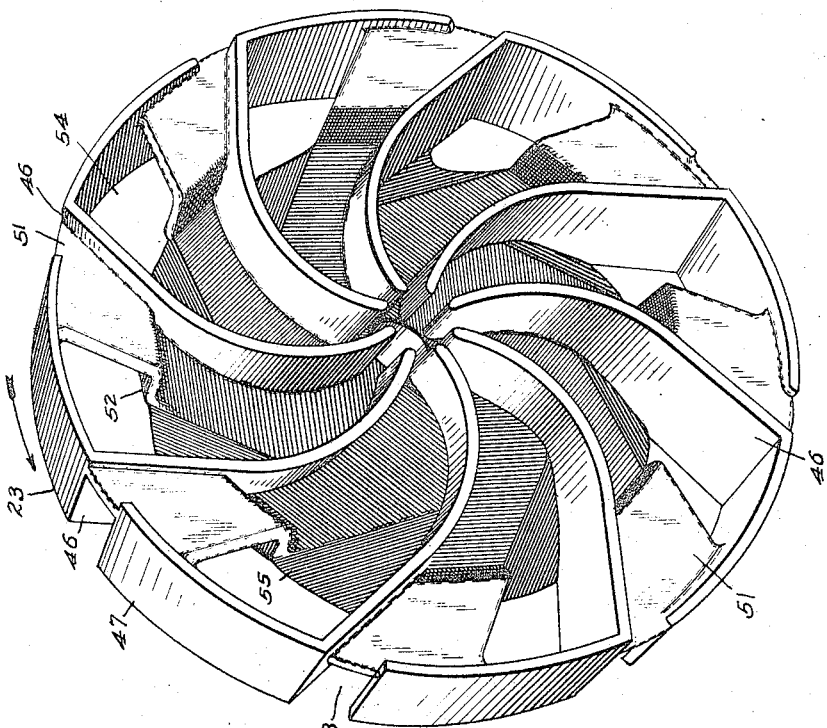
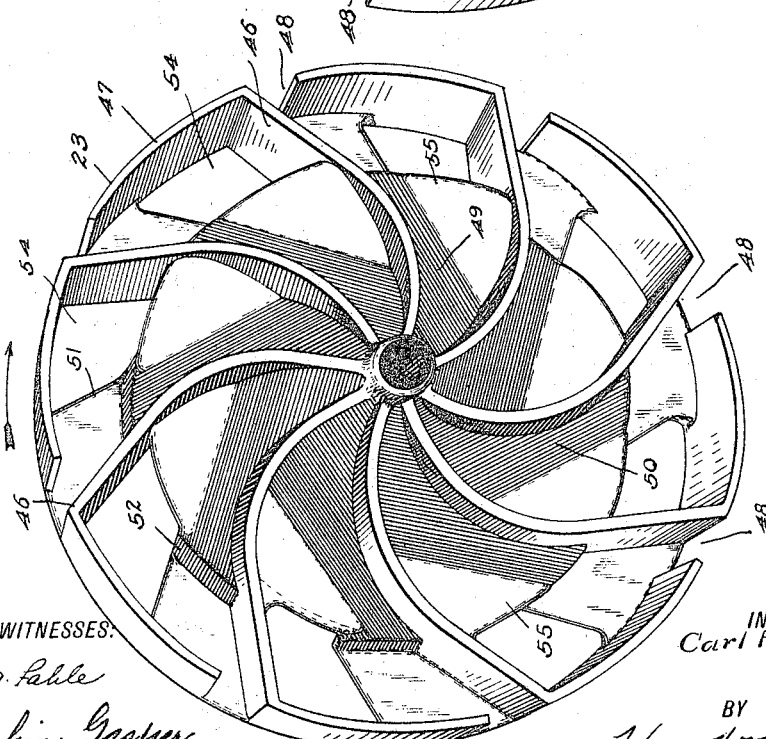

UNITED STATES PATENT OFFICE.

CARL ROY HOUGHTON, OF CONNERSVILLE, INDIANA, ASSIGNOR TO CONNERSVILLE BLOWER COMPANY, OF CONNERSVILLE, INDIANA, A CORPORATION OF INDIANA.

DUST-SEPARATOR.

1,232,464.   Specification of Letters Patent.   Patented July 3, 1917.

Application filed July 10, 1916. Serial No. 108,281.

*To all whom it may concern:*

Be it known that I, CARL R. HOUGHTON, a citizen of the United States, residing at Connersville, in the county of Fayette and State of Indiana, have invented a new and useful Dust-Separator, of which the following is a specification.

My invention relates to the removal of dust from air in pneumatic conveying systems, such as in the handling of slack coal, ashes, crushed stone, and dirt, and in vacuum cleaning. Such materials as those mentioned have been successfully conveyed through pipes by a stream of air, and the heavier solid particles thus conveyed have been collected in receiving tanks. However, the removal of the dust and the finer particles, which are carried by the air both in these pneumatic conveying systems and in vacuum cleaning systems, has ordinarily not been accomplished except by filtering, which requires large and expensive apparatus in the pneumatic conveying systems, so that such dust has frequently been blown with the air into the atmosphere.

It is the object of my present invention to provide a simple and efficient apparatus, requiring little or no attention, for removing such dust and finer particles from a stream of air (or other gas), whether the system is a pressure or a vacuum system.

Figure 3:
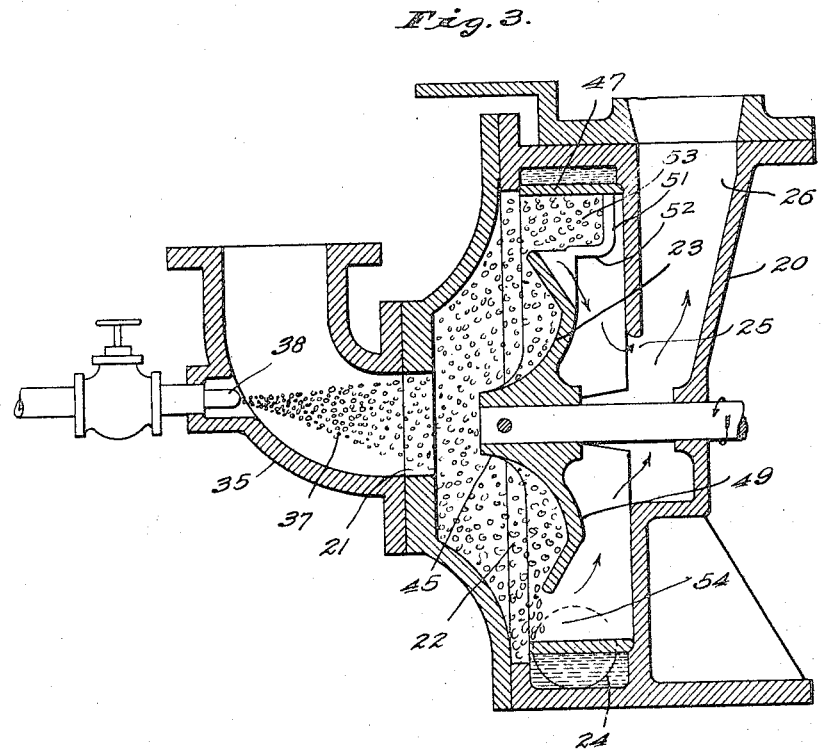
Figure 4:
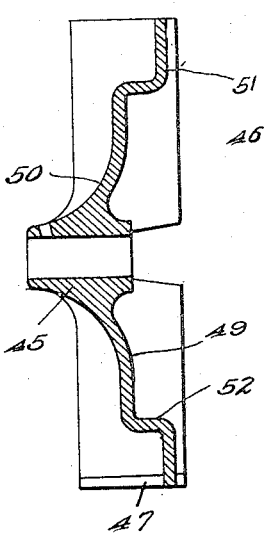

The accompanying drawings illustrate my invention in connection with a vacuum system, particularly for vacuum cleaning. Figure 1 is an elevation of a dust-separating apparatus embodying my invention; Fig. 2 is a section on the line 2—2 of Fig. 1; Fig. 3 is a central vertical section through the separator proper, with the section taken through the runner to cut the peripheral segmental guard flanges; Fig. 4 is a section through the runner alone, with the section taken to cut between adjacent peripheral segmental guard flanges; Fig. 5 is a perspective view of the runner taken from the receiving side; and Fig. 6 is a perspective view of the runner taken from the air-discharging side.

An air-moving device 10, here shown as a positive pressure blower of the impeller type, is suitably driven by a motor 11, conveniently an electric motor, and preferably has its intake or suction port 12 at the top and its pressure or discharge port 13 at the bottom, so that if any liquids or solids are accidentally carried into it they will pass through it by gravity. The discharge port 13 of the air-moving device communicates with the atmosphere, in any suitable manner, being shown as doing so through the hollow base 14 on which the entire apparatus is mounted and a discharge pipe 15 which opens to the atmosphere at any desired point.

My centrifugal dust separator 20 is also driven by the motor 11, such dust separator, air-moving device 10, and motor 11 preferably being directly connected, as shown. The centrifugal separator 20 has an axial inlet opening 21 on the side away from the air-moving device 10, which inlet opening leads to a cylindrical space 22 in which is mounted the runner 23 of my separator, and the cylindrical space 22 has a tangential water- and dust-discharge opening 24, and an axial air-discharge opening 25 on the opposite side of the runner 23 from the inlet opening 21, the air-discharge opening 25 communicating with a vertical passage 26 connected by an air conduit 27 to the inlet port 12 of the air-moving device 10. The air conduit 27 is preferably provided with a safety valve 28, which opens to permit ingress of air in case more than a predetermined suction is developed. The water- and dust-discharge opening 24 leads by a pipe 29 to any suitable discharge point and is provided with a check valve 30 for preventing back flow.

The inlet opening 21 of the separator is connected by an L 35 to a pipe 36 which extends to the intake for air and whatever solid matter is carried by it—in the vacuum system shown to the intake fitting of the vacuum cleaner. The stream of air is caused to flow through the pipe 36 by the action of the air-moving device 10, in this case a suction action. One or more sprays of water are discharged into the dust-carrying air stream before it reaches the separator 20. Such a spray 37 may be provided by a nozzle 38 supplied with water from any suitable source and discharging into the air stream in the L 35, in the direction of the stream flow, as shown in Fig. 3, which spray is independent of the stream flow; or a spray may be provided by a pipe 39 which at one end opens transversely into the pipe 36 above the L 35 and at the other dips into a water tank 40 in which a substantially constant water level is maintained by an ordinary float valve 41 controlling an inlet from a water-supply pipe 42, the suction produced in the pipe 36 serving to draw water from the tank 40 through the pipe 39 into the pipe 36, and the velocity of the air stream serving to atomize the water discharged into the pipe 36 so that no discharge nozzle is necessary and the pipe 39 may be made sufficiently large so that there is practically no danger of its becoming clogged. The spray from the pipe 39 into the pipe 36 is directly dependent upon the air stream, ceasing when the air flow ceases and starting again when the air stream has attained sufficient velocity to raise the water from the tank 40. Either of these spray devices may be used, or both may be used together as shown in Fig. 1. The tank 40 may be provided with an overflow pipe 43, for taking care of the extra water if the float valve 41 does not work, this overflow pipe conveniently discharging into the pipe 29.

The spray or sprays of water in the dust-laden air moisten the dust particles and cause them to coalesce into larger masses. These larger masses of water and dust are thrown outward by the runner 23 of my separator into the annular space at the outer edge of the cylindrical space 22, beyond the periphery of the runner 23, from which annular space the mixed water and dust are thrown out through the water- and dust-discharge opening 24 and carried by the pipe 29 to the desired point of deposit; but the air, being lighter than the dust and water and in consequence being acted on less strongly by the centrifugal force developed by the runner 23, passes inward to the air-discharge opening 25, whence it is carried by the vertical passage 26 and the conduit 27 to the blower 10, which produces the movement of the air stream.

In order that the separation of the dust and water from the air shall be complete, the runner 23 is of the special form shown. This form of runner has been developed as a result of a long series of experiments, and has been found in actual practice to produce practically complete separation.

This runner comprises a hub 45 carrying a series of curved radiating blades 46, which are convex on the forward faces and concave on the rear faces. Each blade 46 is provided at its outer end with a rearwardly extending peripheral segmental guard flange 47 which extends nearly but not quite to the next blade 46 to the rear, leaving an opening 48 between the rear end of such flange 47 and such next blade to the rear. A web 49 joins each blade 46 to the next blade. Such web is located at an intermediate point between the axial ends of the blades, as clear from Figs. 3 and 4, and has a concave flaring surface 50 on the receiving side of the runner, which surface 50 leads to a blunt axial apex so that the oncoming stream is turned outwardly by such surface 50, which conforms to the natural stream line. The rearward portion of the web 49 extends outward to the periphery of the runner, having an offset portion 51 toward the discharge end of the runner near the periphery; and this offset portion is joined to the main portion of the web by a segmental shelf 52 which with the offset portion 51 and the blade 46 to the rear forms a water- and dust-receiving pocket 53 leading to the peripheral escape opening 48. The forward portion of the web 49, however, does not extend entirely to the periphery, thereby leading an air-escape opening 54, and this air-escape opening 54 is guarded from water and dust by making the forward portion 55 of such web skewed so as to form a deflector which will throw the dust and water engaging it backward into the pocket 53. In order to provide the air-escape opening 54, the offset portion 51 extends from the blade 46 to the rear only part way forward toward the blade 46 ahead.

When the stream of air carrying the dust and water strikes the receiving side of the runner 23, it is deflected outward by the stream-line surface 50 of the webs 49, and is caught and carried circumferentially by the blades 46. As the stream radiates, the heavier particles for the most part lie closely against the advancing convex surfaces of the blades 46, and any of such particles which may not do so are thrown to the rear by the skewed portions 55. These heavier particles pass over the offset portion 52 into the pockets 53, thence escaping through the peripheral openings 48 into the annular space outside the segmental guard flanges 47 and at the outside of the circumferential space 22. The centrifugal force which has been developed carries these heavier particles of dust and water, which have now collected into a stream of muddy water, around the inner circumferential face of the space 22 and out through the water- and dust-discharging opening 24 and pipe 29 to the desired point of deposit. The air, however, being lighter than the dust and water, passes through the openings 54 and inward between the blades 46 on the discharge side of the web 49 to the opening 25, and thence to the passage 26 and conduit 27 to the intake of the blower 10.

I claim as my invention:

1. A centrifugal separator, comprising a casing, and a runner rotatably mounted therein, said runner comprising a series of radiating blades convex on their forward surfaces, peripheral segmental guard flanges extending rearward from the outer ends of said blades, and webs joining adjacent blades and extending farther outward along the blades to the rear than along the blades in advance.

2. A centrifugal separator, comprising a casing, and a runner rotatably mounted therein, said runner comprising a series of radiating blades convex on their forward surfaces, and webs joining adjacent blades and extending farther outward along the blades to the rear than along the blades in advance.

3. A centrifugal separator, comprising a casing, and a runner rotatably mounted therein, said runner comprising a series of radiating blades, peripheral segmental guard flanges extending rearward from the outer ends of said blades, and webs joining adjacent blades and extending farther outward along the blades to the rear than along the blades in advance.

4. A centrifugal separator, comprising a casing, and a runner rotatably mounted therein, said runner comprising a series of radiating blades, and webs joining adjacent blades and extending farther outward along the blades to the rear than along the blades in advance.

5. A centrifugal separator, comprising a casing, and a runner rotatably mounted therein, said runner comprising a series of radiating blades, and webs joining adjacent blades and extending farther outward along the blades to the rear than along the blades in advance, the portions of the webs toward the blades to the rear being offset near the periphery of the runner away from the receiving side of the runner.

6. A centrifugal separator, comprising a casing, and a runner rotatably mounted therein, said runner comprising a series of radiating blades, and webs joining adjacent blades and extending farther outward along the blades to the rear than along the blades in advance, portions of the webs toward the blades ahead being skewed to deflect toward the blades in the rear the heavier particles of the stream being separated.

7. A centrifugal separator, comprising a casing, and a runner rotatably mounted therein, said runner comprising a series of radiating blades, and webs joining adjacent blades and extending farther outward along the blades to the rear than along the blades in advance, portions of the webs toward the blades ahead being skewed to deflect toward the blades in the rear and heavier particles of the stream being separated, and the portions of the webs toward the blades to the rear being offset near the periphery of the runner away from the receiving side of the runner.

8. A centrifugal separator, comprising a casing, and a runner rotatably mounted therein, said runner comprising a series of radiating blades, peripheral segmental guard flanges extending rearward from the outer ends of said blades, and webs joining adjacent blades and extending farther outward along the blades to the rear than along the blades in advance, the portions of the webs toward the blades to the rear being offset near the periphery of the runner away from the receiving side of the runner.

9. A centrifugal separator, comprising a casing, and a runner rotatably mounted therein, said runner comprising a series of radiating blades, peripheral segmental guard flanges extending rearward from the outer ends of said blades, and webs joining adjacent blades and extending farther outward along the blades to the rear than along the blades in advance, the portions of the webs toward the blades to the rear being offset near the periphery of the runner away from the receiving side of the runner, and the portions of the webs toward the blades to the rear being offset near the periphery of the runner away from the receiving side of the runner.

10. A centrifugal separator, comprising a casing, and a runner rotatably mounted therein, said runner comprising a series of radiating blades, and webs joining adjacent blades and extending farther outward along the blades to the rear than along the blades in advance, the faces of said webs toward the receiving side of the runner being concave with an axial apex so as to form a stream-like deflecting surface for deflecting the stream outward toward the periphery of the runner.

In witness whereof, I have hereunto set my hand at Connersville, Indiana, this sixth day of July, A. D. one thousand nine hundred and sixteen.

CARL ROY HOUGHTON.

Witnesses:
JOHN T. WILKIN,
F. D. SNYDER.